United States Patent Office 3,682,663
Patented Aug. 8, 1972

3,682,663
CONVENIENCE PACKAGE FOR THE PREPARATION OF SINGLE-CRUST PIES AND THE LIKE
Denis Robinson and Richard Howard Whelan, Medfield, and Philip Harvey Katz, Milford, Mass., and Anthony George Montuori, Plainview, N.Y., assignors to CPC International, Inc.
No Drawing. Filed Apr. 1, 1970, Ser. No. 24,881
Int. Cl. B65b 23/18, 25/22
U.S. Cl. 99—192
8 Claims

ABSTRACT OF THE DISCLOSURE

A frozen food package for the preparation of single-crust pies such as meat- or fish-based "pot pies" or the like comprises an outer carton containing at least one "cooking pouch" containing a suitable frozen precooked filling and at least one precooked vacuum packed frozen pastry crust which is adaptable to being thawed and heated in a conventional automatic toaster. The filling and pastry are present in the carton in at least unit portions and in respective amounts which are complementary to each other.

---

This invention relates to a novel and convenient frozen food package for consumer or institutional use.

Individual single-crust pies, such as the so-called "pot pies" or fruit "cobblers," have long been favorites with the public. Pot pies consist of a filling, usually comprising one or more meat ingredients (e.g. chicken, beef, steak and kidneys, or the like), one or more vegetables, plus a compatible sauce, and a pastry crust. They are generally prepared in individual, heat proof casserole dishes, by first preparing the filling and placing it in the casserole dishes, then placing a layer of pastry dough over the top, and baking until done.

Although the basic recipes for pot pies and the like are relatively simple, they are seldom prepared in the home. Many homemakers do not possess the individual casserole dishes necessary for their preparation, and furthermore, the length of time required for the preparation of the filling, preparation of the pastry, cutting the pastry into the desired shape, assembly, and final cooking, is more than the average busy wife and mother can undertake. For the aforementioned reasons, pot pies are generally found only in restaurants, and even many restaurant chefs find their preparation too time consuming to be practical or desirable.

It is an object of the present invention to prepare a frozen food package with which a single-crust pie can be prepared in an extremely short time and simple manner.

Another object is to devise a frozen food package for the preparation of a meat-based "pot pie," a fruit-based "cobbler," or the like, which can be prepared and ready for consumption in less than about 20 minutes time.

An additional object is to devise a frozen food package for home or institutional use, which can readily be converted into a hearty, nutritious, and delicious meal in a remarkably short time, with conventional utensils found in every kitchen.

In accordance with the invention, the "frozen pie" is prepared and assembled as follows. An appropriate filling, which, in the case of a pot pie will ordinarily consist of cut-up, or diced, pieces of meat or fish (e.g. chicken, beef, steak and kidneys, tuna or the like), one or more vegetables, and a suitable compatible sauce is prepared and precooked. By "precooked" is meant either fully cooked or almost fully cooked, that is, cooked to such a degree that complete cooking can readily be accomplished by immersion of the final frozen packaged product into boiling water for a short period of time. One or more unit portions of the filling is then placed in a pouch, preferably flexible, made of a material capable of withstanding both freezer temperatures and contact with boiling water, and the pouch is sealed. Suitable pouches include any of the so-called "cooking pouches," also known as "boil-in-the-bag" pouches, which are so popular for the packaging of frozen liquid and solid foodstuff mixtures. These pouches are usually made of a heat sealable, flexible, generally transparent plastic film or lamination such as nylon film or a lamination of polyester and polyethylene, or the like. After the pouch has been filled and sealed it is subjected to a conventional deep freezing operation.

The pastry can be prepared from any conventional pastry recipe or formula. A standard pie crust recipe can be used, or a "flaky pastry" recipe, a "puff pastry" formula, a baking powder biscuit type of pastry, or the like. The pastry dough is mixed, rolled out, and cut into suitable shapes. The pastry can be cut into any desired shapes, although a rectangular (including square), circular, or oval shape is preferable from the standpoint of ease of handling and packaging. It could, of course, be cut into stars, crescents, or any other attractive shape. Because the pastry is to be prepared for consumption by the consumer by subjecting it to a conventional toasting process (which will be defined hereinafter), probably in a home toaster, the dimensions of the pastry crust, after baking, should be not greater than 4½ inches in length, not greater than 4½ inches in height and not greater than ½ inch in thickness (the maximum dimensions of the slot of the average toaster). Furthermore, because a standard automatic toaster will not "pop-up" if an item weighing more than about 2 oz. is placed within the slot, the total weight of each crust should not exceed about 2 oz.

After the pastry has been cut into the desired shapes, the individual pieces are prebaked in a conventional manner. By the term "prebaked" is meant either fully baked or baked to such an extent that a normal toasting process will, in addition to thawing and heating the frozen crust, render it completely baked and ready for consumption. After the prebaking step, the pastry crusts are frozen and wrapped.

Proper wrapping of the crusts is important to the successful practicing of the invention. Because prebaked biscuit- or pie-pastry crusts are quite fragile, they have a tendency to break if they are packaged in contact with a heavy, rather irregularly shaped item such as the pouch containing the frozen filling. It has been found that breakage can be substantially eliminated if one or more crusts are wrapped tightly in such a way that no air is in contact with the crusts, and the wrapping material closely conforms to the crusts. Suitable methods of wrapping include shrink wrapping and vacuum packaging.

By "shrink wrapping" is meant placing a shrinkable material, e.g. a film of plastic which will shrink upon the application of heat, around the product and then causing the film to shrink until it closely and tightly conforms to the product. The product (i.e. one or more crusts) can be shrink wrapped alone, but it is preferable to shrink wrap it on a rigid paperboard (i.e. by first placing the product on the board and then wrapping the entire assembly with a shrinkable film) for additional rigidity and stability.

The preferred method of wrapping, from the standpoint of breakage resistance and economy, is conventional vacuum packaging, for example in a plastic pouch, envelope, or the like. One or more crusts are placed in a pouch, a vacuum of within the range of from about 20 to about 29 inches is drawn, and the pouch is sealed. Another suitable method of vacuum packaging is the so-called "blister-pack" process, in which the product is placed upon a fairly rigid paperboard and the assembly packaged, as in a flexible plastic film, under vacuum.

The frozen food package is made up by placing, in a suitable carton, at least one pouch containing the frozen filling and at least one wrapped frozen pastry crust per unit portion of filling. The package is then kept in a frozen condition until ready to use.

Preparation of the pot pies for consumption is extremely simple. The consumer merely places the pouch containing the filling into a pan of boiling water for a sufficient length of time to completely heat, and, if necessary, complete the cooking of, the filling. Generally, a boiling time of about 12–15 minutes is adequate for a pouch containing two average servings of filling. Shortly before the filling is ready to serve (e.g. about 3 minutes before the end of the boiling period) the consumer unwraps the crusts and subjects them to a conventional toasting process. By this is meant any process by which slices of bread are conventionally toasted, e.g. inserting the crusts into an ordinary toaster or placing them on a broiler for a length of time sufficient to toast bread. In an automatic home toaster, this is generally about 2 minutes. The consumer then merely places the heated crust on a plate and pours the filling over it.

Individual fruit "cobblers" or single-crust tarts or the like can also be prepared in accordance with the process of the invention in which case, of course, the filling would comprise a suitable fruit pie filling rather than a meat-vegetable-sauce mixture. The steps of packaging, assembling, freezing, and preparing for consumption are the same as for meat-based pies.

The following examples will illustrate the practice of the invention. They are presented for illustrative purposes only, and should not be considered as limiting the scope of the invention in any way.

EXAMPLE I

Pennsylvania Dutch style chicken pot pie (two serving unit)

Chicken was fully cooked and the meat diced in approximately ½ inch cubes. A sauce was then prepared, containing chicken broth, potatoes, onions, parsley, margarine, flour, starch, salt, pepper and glyceryl monostearate. Sixty-five grams of the chicken and about 340 grams of the sauce were placed in a 6½ inch by 7½ inch Mylar/polyethylene cooking pouch, the pouch was sealed, and the product was blast frozen to below 0° F.

A pastry dough was prepared using flour, water, shortening, sugar, leavening, salt, seasoning, certified color and emulsifier. The dough was sheeted (rolled out) to a thickness of about ¼ inch, cut into squares about 4 inches in width, and then baked. The crusts were wrapped by placing two crusts into a 6½ inch by 7½ inch Mylar/polyethylene pouch, drawing a vacuum of about 28", and then sealing the pouch. The product was then blast frozen to below 0° F.

The product was then packaged by placing one boilable pouch and one crust package (containing two crusts) into a 5¾ inch by 2 inch by 7 inch carton. The cartons were stored under frozen conditions.

To prepare, the pouch containing the filling was placed in a pan containing two quarts of rapidly boiling water and permitted to remain for 15 minutes. After about 12 minutes boiling time, the crusts were unwrapped and placed in a conventional automatic toaster and heated at a medium setting for one cycle of the toaster (about two minutes). The crusts were then placed on plates, the filling removed from the pouch and poured over the crusts, and the product served. The prepared dish was excellent in flavor and texture, and was indistinguishable from a "home cooked" or "restaurant cooked" pot pie.

EXAMPLE II

Beef pie "a la Dutch" (two serving unit)

Beef chuck was fully cooked and the meat was sliced into strips 1½ inches long by ¼" by ¼". A sauce was prepared, containing beef stock, brown gravy, mushrooms, onions, green peppers, red wine, starch, garlic salt, bay leaf, peppers, parsley, and glyceryl monostearate. Ninety-two grams of the beef and about 305 grams of the sauce were placed in a 6½ inch by 7½ inch Mylar/polyethylene cooking pouch; the pouch was sealed and the product was blast frozen to below 0° F.

A pastry dough was prepared using flour, water, shortening, sugar, leavening, salt, seasoning, certified color and emulsifier. The dough was sheeted (rolled out to a thickness of about ¼ inch), cut into circles about 4 inches in diameter, and then baked. The crusts were wrapped by placing two crusts into a 6½ inch by 7½ inch pouch made from a lamination of polyethylene and cellophane, drawing a vacuum of about 24", and then sealing the pouch. The product was then blast frozen to below 0° F.

The product was then packaged by placing one boilable pounch and one crust package (containing two crusts) into a 5¾ inch by 2 inch by 7 inch carton. The cartons were were stored under frozen conditions.

Preparation of the product for consumption was the same as in Example I. As was the case in Example I, the prepared dish was excellent in flavor and texture, and was indistinguishable from a "home cooked" or "restaurant cooked" pot pie.

EXAMPLE III

Deep dish cherry cobbler (two serving unit)

A pie filling was prepared containing canned sour pie cherries with juice, sugar, red color, starch, water, lemon juice, butter and salt. Four hundred and four grams of sauce with cherries were placed in a 6½ inch by 7½ inch Mylar/polyethylene cooking pouch, the pouch was sealed and the product was blast frozen to below 0° F.

A pastry dough was prepared using flour, water, shortening, sugar, leavening, salt, seasoning, certified color and emulsifier. The dough was sheeted (rolled out to a thickness of about ¼ inch), cut into circles about 4 inches in diameter, and then baked. The crusts were wrapped by placing two crusts into a 6½ inch by 7½ inch Mylar/polyethylene pouch, drawing a vacuum of about 24", and then sealing the pouch. The product was then blast frozen to below 0° F.

The product was then packaged by placing one boilable pounch and one crust package (containing two crusts) into a 5¾ inch by 2 inch by 7 inch carton. The cartons were stored under frozen conditions.

Preparation of the product for consumption was the same as in Examples I and II. As was the case in the previous examples, the prepared dish was excellent in flavor and texture, and was indistinguishable from a "home cooked" or "restaurant cooked" cherry cobbler.

While the invention has been described in connection with specific embodiments thereof, it will be understood that it is capable of further modification, and this application is intended to cover any variations, uses, or adaptation of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A frozen food package comprising an outer carton, and disposed within said outer carton:
    (a) at least one pouch made of flexible material, capable of withstanding contact with boiling water, containing at least one portion of a frozen precooked liquid-containing foodstuff, said frozen precooked foodstuff being capable of becoming heated and suitable for consumption upon contacting said pouch with boiling water; and
    (b) at least one unit portion of prebaked frozen pastry in a vacuum packed pouch made of flexible plastic film, the vacuum being within the range of from about 20 to about 29 inches of mercury, said said pastry being capable of becoming heated and suitable for consumption upon subjecting same to a conventional toasting process;
the respective amounts of the frozen precooked foodstuff and of the pastry being such that they are each in complementary proportions to each other, and in at least unit portions.

2. A frozen food package in accordance with claim 1, wherein the frozen precooked liquid-containing foodstuff contained in said pouch comprises a chicken pie filling, containing diced chicken, vegetables, a chicken-flavored sauce, and appropriate seasonings.

3. A frozen food package in accordance with claim 1, wherein the frozen precooked liquid-containing foodstuff contained in said pouch comprises a beef pie filling, containing diced beef, vegetables, a beef-flavored sauce, and appropriate seasonings.

4. A frozen food package in accordance with claim 1, wherein said liquid-containing foodstuff comprises a fruit pie filling.

5. A frozen food package in accordance with claim 1, wherein said pastry is in the form of a rectangular wafer, having a length not greater than about 4½ inches, a height not greater than about 4½ inches, a thickness not greater than about ½ inch, and a weight not greater than about 2 ounces.

6. A frozen food package in accordance with claim 1, wherein said pastry is in the form of an approximately circular wafer, having a diameter not greater than about 4½ inches, a thickness not greater than about ½ inch, and a weight not greater than about 2 ounces.

7. A frozen food package in accordance with claim 1, wherein said liquid-containing foodstuff comprises a mixture of a proteinaceous foodstuff with a compatible sauce.

8. A frozen food package in accordance with claim 7, wherein the proteinaceous foodstuff comprises a member selected from the group consisting of poultry and beef.

References Cited

UNITED STATES PATENTS

| | | | |
|---|---|---|---|
| 3,061,441 | 10/1962 | Halbach | 99—172 X |
| 3,441,418 | 4/1969 | Nishikiori | 99—171 X |
| 2,784,103 | 3/1957 | Paxton | 99—171 X |
| 2,990,096 | 6/1961 | Crosby | 99—171 CP |
| 3,182,890 | 5/1965 | Elam | 99—171 UX CP |
| 3,407,078 | 10/1968 | Schlichter | 99—172 |

OTHER REFERENCES

Modern Packaging, November 1956, pp. 99—103.
Modern Packaging, March 1956, pp. 174, 175, 371.
Modern Packaging Encyclopedia, July 1968, pp. 222 and 223.

FRANK W. LUTTER, Primary Examiner
S. L. WEINSTEIN, Assistant Examiner

U.S. Cl. X.R.

99—171 PP, 171 H, 172, 174, 194; 206—46 F, 47 R